(12) United States Patent
Kroeger et al.

(10) Patent No.: US 7,706,474 B2
(45) Date of Patent: Apr. 27, 2010

(54) CARRIER TRACKING FOR AM IN-BAND ON-CHANNEL RADIO RECEIVERS

(75) Inventors: Brian William Kroeger, Sykesville, MD (US); Kun Wang, New Providence, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 1116 days.

(21) Appl. No.: 11/273,396

(22) Filed: Nov. 14, 2005

(65) Prior Publication Data

US 2007/0110186 A1   May 17, 2007

(51) Int. Cl.
H03D 1/24 (2006.01)
H04L 27/08 (2006.01)

(52) U.S. Cl. ...................... 375/320; 375/345

(58) Field of Classification Search .............. 375/320, 375/316
See application file for complete search history.

(56) References Cited

U.S. PATENT DOCUMENTS

| | | | |
|---|---|---|---|
| 4,215,239 A | | 7/1980 | Gordy et al. |
| 4,330,758 A | * | 5/1982 | Swisher et al. ............ 331/1 A |
| 4,691,176 A | | 9/1987 | Hsiung et al. |
| 5,073,907 A | | 12/1991 | Thomas, Jr. |
| 5,410,573 A | | 4/1995 | Taga et al. |
| 5,566,214 A | * | 10/1996 | Kroeger et al. ............ 375/355 |
| 5,579,345 A | | 11/1996 | Kroeger et al. |
| 5,828,705 A | * | 10/1998 | Kroeger et al. ............ 375/326 |
| 5,875,215 A | | 2/1999 | Dobrica |
| 5,889,759 A | | 3/1999 | McGibney |
| 5,909,148 A | | 6/1999 | Tanaka |
| 5,978,727 A | * | 11/1999 | Jones et al. ................ 701/101 |
| 6,021,110 A | | 2/2000 | McGibney |
| 6,028,903 A | * | 2/2000 | Drost et al. ................ 375/360 |
| 6,097,768 A | | 8/2000 | Janesch et al. |
| 6,490,010 B1 | | 12/2002 | Shibuya et al. |
| 6,594,320 B1 | | 7/2003 | Sayeed |
| 6,683,920 B1 | | 1/2004 | Coy |
| 6,693,979 B1 | | 2/2004 | Kumar |
| 6,704,377 B1 | | 3/2004 | Hsuan |
| 6,833,766 B2 | | 12/2004 | Kim et al. |
| 6,904,098 B1 | | 6/2005 | Isaksen et al. |
| 6,950,266 B1 | * | 9/2005 | McCaslin et al. ............ 360/75 |
| 2003/0051479 A1 | * | 3/2003 | Hogle et al. ................ 60/772 |
| 2003/0161414 A1 | | 8/2003 | Jun |
| 2004/0001563 A1 | | 1/2004 | Scarpa |
| 2004/0087294 A1 | * | 5/2004 | Wang ...................... 455/276.1 |
| 2004/0196915 A1 | | 10/2004 | Gupta |

(Continued)

Primary Examiner—David C Payne
Assistant Examiner—Brian J Stevens
(74) Attorney, Agent, or Firm—Robert P. Lenart, Esq.; Pietragallo Gordon Alfano Bosick & Raspanti, LLP

(57) ABSTRACT

A method for carrier tracking in AM in-band on-channel radio receivers comprises the steps of receiving an input signal, generating a local oscillator signal in response to an oscillator control signal, mixing the input signal with a local oscillator signal to produce a first signal, filtering the first signal to produce a filtered first signal at a decimated sample rate, detecting the phase error and frequency error of the filtered first signal normalized to mitigate effects of signal fades, and using an adaptive loop filter to produce the oscillator control signal in response to the phase error and frequency error of the filtered first signal. An apparatus that performs the method is also provided.

21 Claims, 8 Drawing Sheets

U.S. PATENT DOCUMENTS

| | | |
|---|---|---|
| 2005/0105657 A1 | 5/2005 | Kroeger et al. |
| 2005/0141646 A1 | 6/2005 | Han |
| 2005/0157820 A1 | 7/2005 | Wongwirawat et al. |
| 2005/0189972 A1* | 9/2005 | Foo et al. .................. 327/156 |
| 2006/0013336 A1* | 1/2006 | Yang et al. ................ 375/316 |
| 2006/0153041 A1* | 7/2006 | Miyashita et al. ....... 369/59.22 |
| 2007/0002727 A1* | 1/2007 | Stessen et al. ............. 370/210 |

* cited by examiner

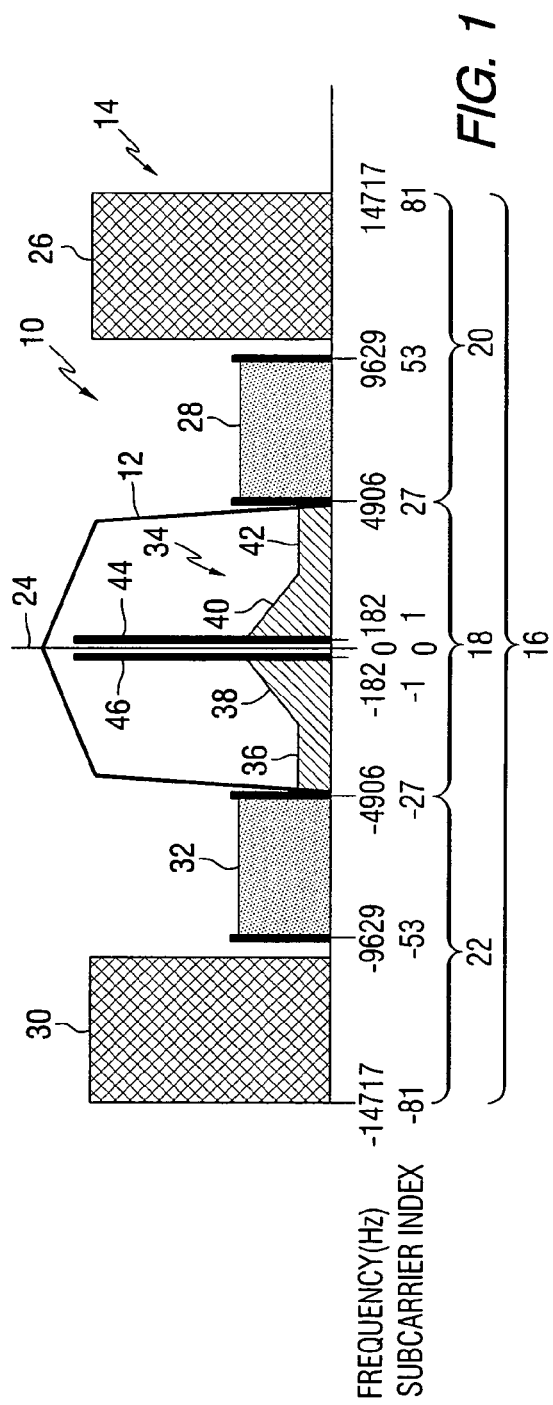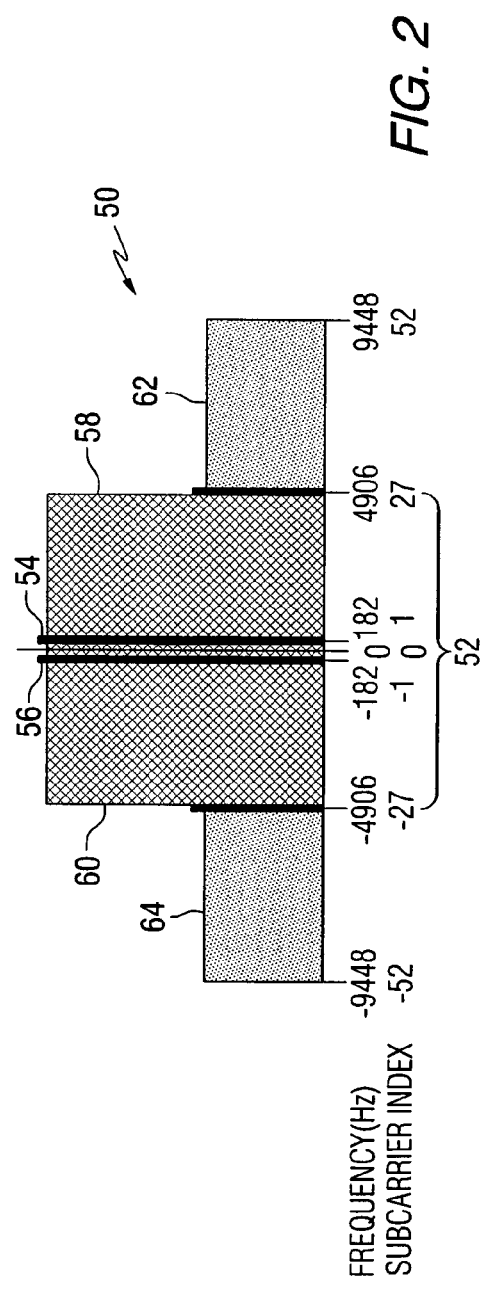

CARRIER TRACKING FOR AM IN-BAND ON-CHANNEL RADIO RECEIVERS

FIELD OF THE INVENTION

This invention relates to radio broadcasting and, more particularly, to methods of and apparatus for tracking carrier signals in a receiver for use with an in-band on-channel digital broadcasting system.

BACKGROUND OF THE INVENTION

An in-band on-channel (IBOC) digital broadcasting system simultaneously broadcasts analog and digital signals in a standard AM broadcasting channel. One AM IBOC system is described in U.S. Pat. No. 5,588,022. The broadcast signal includes an amplitude modulated radio frequency signal having a first frequency spectrum. The amplitude modulated radio frequency signal includes a first carrier modulated by an analog program signal. The signal also includes a plurality of digitally modulated subcarriers within a bandwidth that encompasses the first frequency spectrum. Each of the digitally modulated subcarriers is modulated by a digital signal. A first group of the digitally modulated subcarriers lies within the first frequency spectrum and is modulated in quadrature with the first carrier signal. Second and third groups of the digitally modulated subcarriers lie outside of the first frequency spectrum and are modulated both in-phase and in quadrature with the first carrier signal. The subcarriers are divided into primary, secondary and tertiary partitions. Some of the subcarriers are complementary subcarriers.

The subcarriers must be acquired and tracked in the receivers prior to demodulation of the received signal. Although the performance of existing carrier tracking algorithms is assumed to be reasonably good, they are difficult to analyze or modify without extensive simulation and verification in all possible tracking modes and logic conditions within the tracking algorithms.

Therefore there is a need for a simpler method of carrier tracking that operates autonomously without explicit acquisition or coarse/wideband/narrowband tracking control.

SUMMARY OF THE INVENTION

This invention provides a method for carrier tracking in AM in-band on-channel radio receivers. The method comprises the steps of receiving an input signal, generating a local oscillator signal in response to an oscillator control signal, mixing the input signal with a local oscillator signal to produce a first signal, filtering the first signal to produce a filtered first signal at a decimated sample rate, detecting the phase error and frequency error of the filtered first signal normalized to mitigate effects of signal fades, and using an adaptive loop filter to produce the oscillator control signal in response to the phase error and frequency error of the filtered first signal. An apparatus that performs the method is also provided.

In another aspect, the invention provides an apparatus for carrier tracking in AM in-band on-channel radio receivers. The apparatus comprises an input for receiving an input signal, a local oscillator for generating a local oscillator signal in response to an oscillator control signal, a mixer for mixing the input signal with a local oscillator signal to produce a first signal, a filter for filtering the first signal to produce a filtered first signal at a decimated sample rate, a detector for detecting the phase error and frequency error of the filtered first signal, wherein the filtered first signal is normalized to mitigate effects of signal fades, and an adaptive loop filter for producing the oscillator control signal in response to the phase error and frequency error of the filtered first signal.

BRIEF DESCRIPTION OF THE DRAWINGS

FIG. 1 is a spectral diagram of the AM hybrid IBOC signal.
FIG. 2 is a spectral diagram of the AM all-digital IBOC signal.

DETAILED DESCRIPTION OF THE INVENTION

Figure 3:
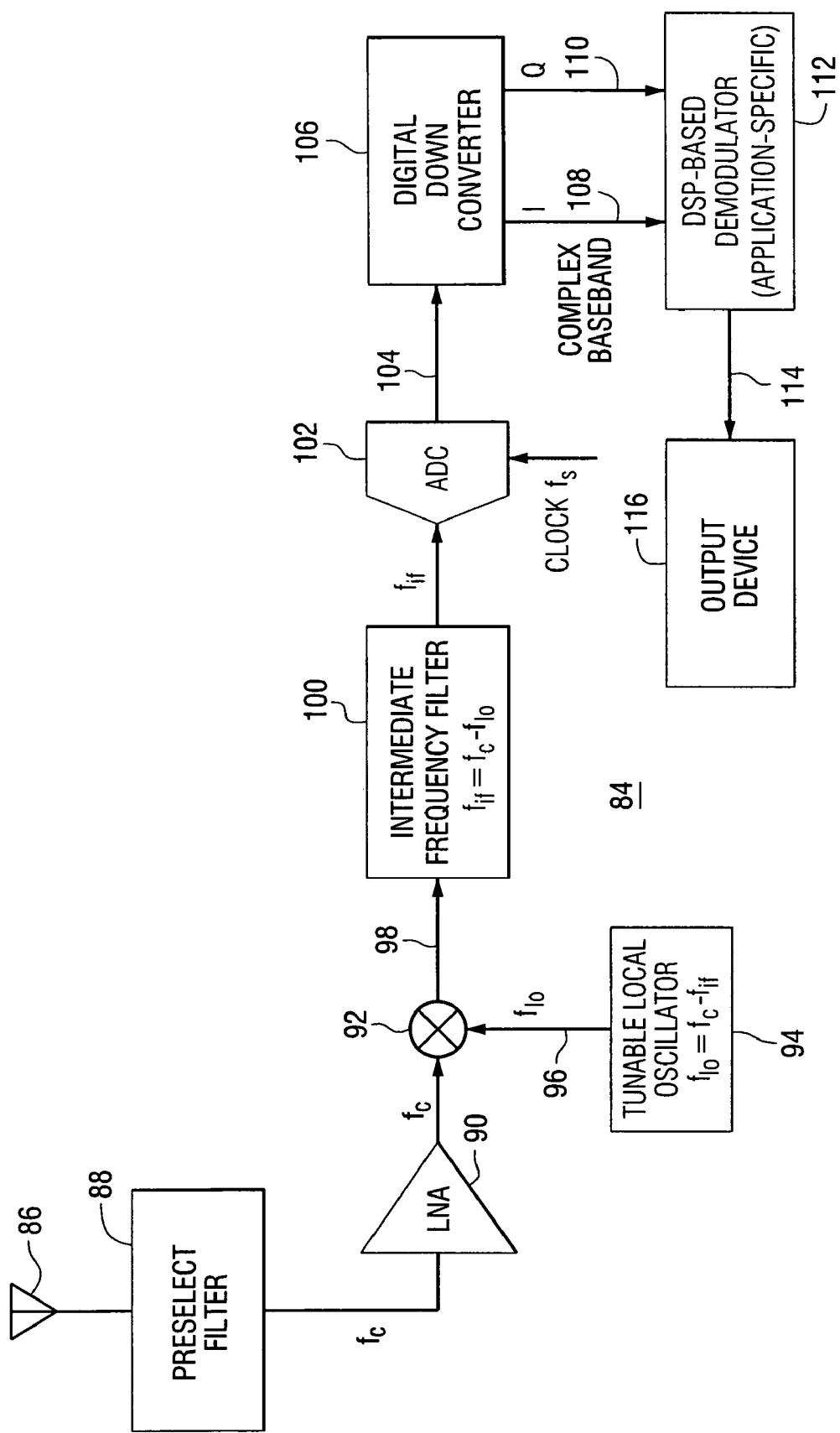
FIG. 3 is a functional block diagram of an AM IBOC receiver.

This invention provides a method for carrier tracking for AM HD Radio™ receivers. It is intended to be suitable for all AM modes, including analog demodulation.

Referring to the drawings, FIG. 1 is a spectral diagram of an AM hybrid IBOC signal. The AM hybrid IBOC waveform 10 includes the conventional AM analog signal 12 (bandlimited to about ±5 kHz) along with a nearly 30 kHz wide digital audio broadcasting (DAB) signal 14 transmitted beneath the AM signal. The spectrum is contained within a channel 16 having a bandwidth of about 30 kHz. The channel is divided into a central frequency band 18, and upper 20 and lower 22 frequency bands. The central frequency band is about 10 kHz wide and encompasses frequencies lying within about ±5 kHz of the center frequency $f_o$ of the channel. The upper sideband extends from about +5 kHz from the center frequency to about +15 kHz from the center frequency. The lower sideband extends from about −5 kHz from the center frequency to about −15 kHz from the center frequency.

AM hybrid IBOC DAB signal format in one embodiment of the invention comprises the analog modulated carrier signal 24 plus 162 OFDM subcarrier locations spaced at approximately 181.7 Hz, spanning the central frequency band and the upper and lower sidebands. Coded digital information, representative of the audio or data signals (program material), is transmitted on the subcarriers. The symbol rate is less than the subcarrier spacing due to a guard time between symbols.

As shown in FIG. 1, the upper sideband is divided into a primary partition 26 and a secondary partition 28, and the lower sideband is divided into a primary partition 30 and a secondary partition 32. The digital signals are transmitted in the primary and secondary partitions on either side of the host analog signal, as well as underneath the host analog signal in a tertiary partition 34. The tertiary partition 34 can be considered to include a plurality of groups of subcarriers labeled 36, 38, 40 and 42 in FIG. 1. Subcarriers within the tertiary partition that are positioned near the center of the channel are referred to as inner subcarriers and subcarriers within the tertiary partition that are positioned farther from the center of the channel are referred to as outer subcarriers. In this example, the power level of the inner subcarriers in groups 38 and 40 is shown to decrease linearly with frequency spacing from the center frequency. The remaining groups of subcarriers 36 and 42 in the tertiary sideband have substantially constant power levels.

FIG. 1 also shows two reference subcarriers 44 and 46, for system control, that are positioned at the first subcarrier positions immediately adjacent to the analog modulated carrier and have power levels which are fixed at a value that is different from the other sidebands.

The center carrier 24, at frequency $f_o$, is not QAM modulated, but carries the main analog amplitude modulated carrier. The synchronization and control subcarriers 44 and 46 are modulated in quadrature to the carrier. The remaining subcarriers of the tertiary partition, positioned at locations designated as 2 through 26 and −2 through −26 on either side of the AM carrier, are modulated with QPSK. Representative subcarrier locations are identified by the subcarrier index shown in FIG. 1. Subcarriers at locations 2 through 26 and −2 through −26 on either side of the central frequency, are referred to as tertiary subcarriers and are transmitted in complementary pairs such that the modulated resultant DAB signal is in quadrature to the analog modulated AM signal. The use of complementary subcarrier pairs in an AM IBOC DAB system is shown in U.S. Pat. No. 5,859,876. The synchronization and control subcarriers 44 and 46 are also modulated as a complementary pair.

The double sideband (DSB) analog AM signal occupies the bandwidth in the ±5 kHz region. The lower and upper tertiary partitions occupy sub-bands from about 0 to about −5 kHz and from about 0 to about +5 kHz regions, respectively. These tertiary partitions are negative complex conjugates of each other and are characterized as complementary. This complementary property maintains an orthogonal relationship between the analog and digital tertiary signals such that they can be separated in a receiver, while existing conventional receivers can still receive the analog AM signal. The tertiary partitions must be complementary combined to extract the digital signal while canceling the analog crosstalk. The secondary partitions also have the complementary property, so they can be processed at the receiver either independently, or after complementary combining, depending on interference conditions and audio bandwidth. The primary partitions are transmitted independently.

FIG. 2 is a spectral diagram of an all-digital IBOC signal 50. The power of the central frequency band 52 subcarriers is increased, relative to the hybrid format of FIG. 1. Again, the two subcarriers 54 and 56 located at locations −1 and +1 use binary phase shift keying to transmit timing information. A core upper sideband 58 is comprised of carriers at locations 2 through 26, and a core lower sideband 60 is comprised of subcarriers at locations −2 through −26. Sidebands 58 and 60 form primary partitions. Two groups 62 and 64 of additional enhancement subcarriers occupy locations 27 through 54 and −54 through −27 respectively. Group 62 forms a secondary partition and group 64 forms a tertiary partition. The all-digital format of FIG. 2 is very similar to the hybrid format except that the AM signal is replaced with a delayed and digitally encoded tuning and backup version of the program material. The central frequency band occupies approximately the same spectral location in both the hybrid and all-digital formats. In the all-digital format, there are two options for transmitting the main version of the program material in combination with the tuning and backup version. The all-digital system has been designed to be constrained within ±10 kHz of the channel central frequency, $f_o$, where the main audio information is transmitted within ±5 kHz of $f_o$, and the less important audio information is transmitted in the wings of the channel mask out to ±10 kHz at a lower power level. This format allows for graceful degradation of the signal while increasing coverage area. The all-digital system carries a digital time diversity tuning and backup channel within the ±5 kHz protected region (assuming the digital audio compression is capable of delivering both the main and audio backup signal within the protected ±5 kHz). The modulation characteristics of the all-digital system are based upon the AM IBOC hybrid system.

The all-digital IBOC signal includes a pair of primary partitions in the ±5 kHz region, a secondary partition in the −5 kHz to −10 kHz region, and a tertiary partition in the +5 kHz to +10 kHz region. The all-digital signal has no analog component, and all partitions are transmitted independently (that is, the partitions are not complementary).

FIG. 3 is a functional block diagram of an IBOC receiver 84 constructed in accordance with this invention. The IBOC signal is received on antenna 86. A bandpass preselect filter 88 passes the frequency band of interest, including the desired signal at frequency $f_c$, but rejects the image signal at $f_c-2f_{if}$ (for a low side lobe injection local oscillator). Low noise amplifier 90 amplifies the signal. The amplified signal is mixed in mixer 92 with a local oscillator signal $f_{lo}$ supplied on line 94 by a tunable local oscillator 96. This creates sum $(f_c+f_{lo})$ and difference $(f_c-f_{lo})$ signals on line 98. Intermediate frequency filter 100 passes the intermediate frequency signal $f_{if}$ and attenuates frequencies outside of the bandwidth of the modulated signal of interest. An analog-to-digital converter 102 operates using a clock signal $f_s$ to produce digital samples on line 104 at a rate $f_s$. Digital down converter 106 frequency shifts, filters and decimates the signal to produce lower sample rate in-phase and quadrature signals on lines 108 and 110. A digital signal processor based demodulator 112 then provides additional signal processing to produce an output signal on line 114 for output device 116.

Figure 4:
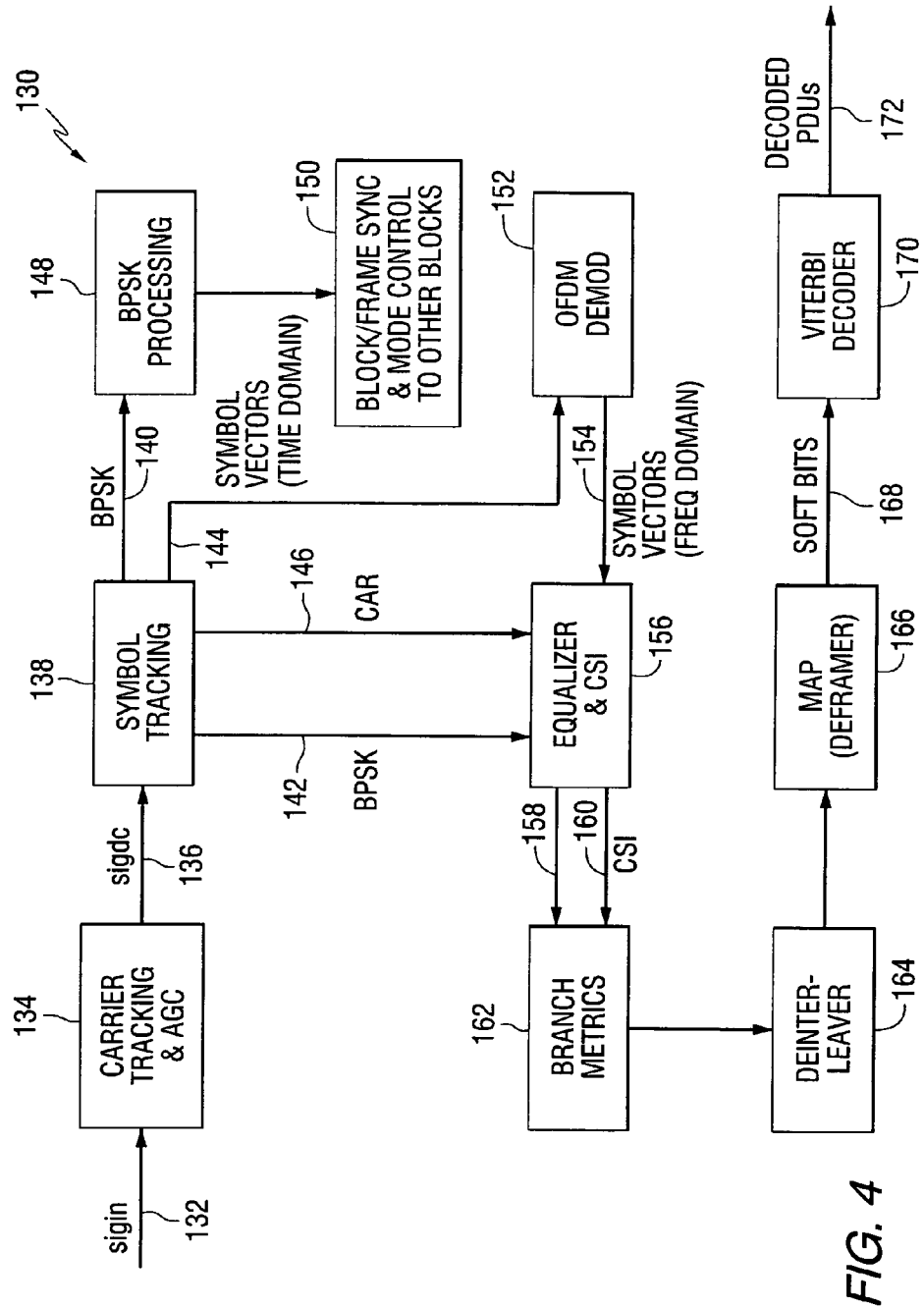
FIG. 4 is a block diagram of a modem for an AM IBOC receiver.

The receiver in FIG. 3 includes a modem constructed in accordance with this invention. FIG. 4 is a functional block diagram of an AM HD Radio™ modem 130 showing the functional location of the carrier tracking of this invention. An input signal on line 132 from the digital down converter is subject to carrier tracking and automatic gain control as shown in block 134. The resulting signal on line 136 is subjected to a symbol tracking algorithm 138 that produces the BPSK signal on lines 140 and 142, symbol vectors (in the time domain) on line 144, and the analog modulated carrier on line 146. BPSK processing, as shown in block 148 produces block/frame sync and mode control information 150 that is used by functions illustrated in other blocks. An OFDM demodulator 152 demodulates the time domain symbol vectors to produce frequency domain symbol vectors on line 154.

The equalizer 156 processes the frequency domain symbol vectors in combination with the BPSK and carrier signals to produce equalized signals on line 158 and channel state information on line 160. These signals are processed to produce branch metrics 162, deinterleaved in a deinterleaver 164, and mapped in a deframer 166 to produce soft decision bits on line 168. A Viterbi decoder 170 processes the soft decision bits to produce decoded program data units on line 172.

Figure 5:
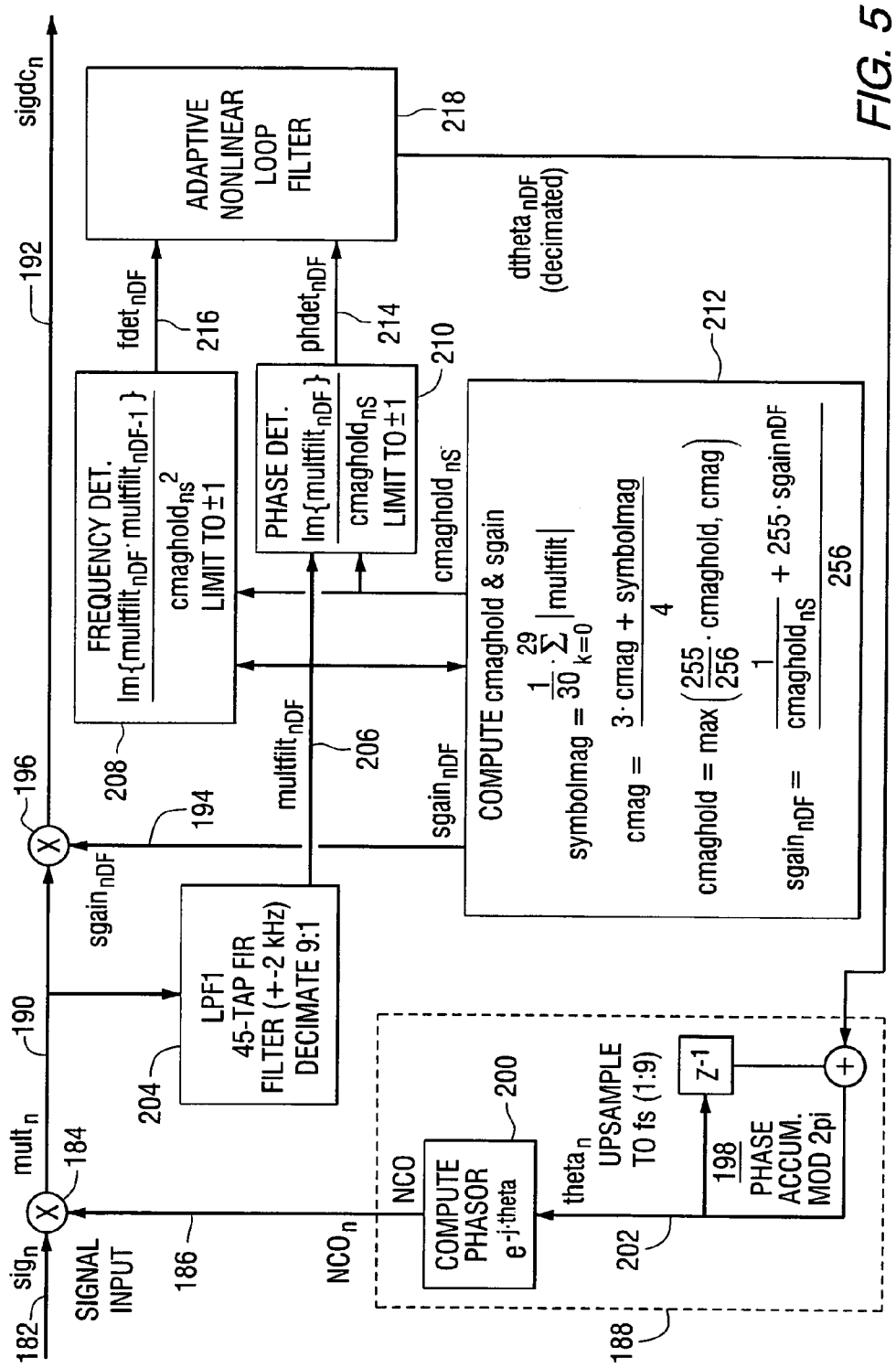
FIG. 5 is a functional block diagram of AM carrier tracking frequency/phase-locked loop.

This invention relates to the carrier tracking function in block 134 of FIG. 4. FIG. 5 is a functional block diagram of AM carrier tracking frequency/phased-locked loop (FPLL). The input signal $sig_n$, comprising a stream of time domain samples on line 182, is mixed to dc in mixer 184 using an output signal $NCO_n$ on line 186 from a frequency and phase-locked numerically controlled oscillator (NCO) 188 to produce a signal $mult_n$ on line 190. The mult signal is the mixed-to-dc signal.

The subscript n indicates the $n^{th}$ sample index at the input sample rate. The output $sigdc_n$ on line 192 is obtained through multiplication of $mult_n$, by a gain control signal $sgain_{nDF}$ on line 194, in multiplier 196. The subscript nDF indicates the sample index after the Decimation Filter (decimate by 9).

The closed-loop processing starts with the signal $mult_n$ and generates the $NCO_n$ value for the next input sample of $sig_n$. The NCO is comprised of a phase accumulator 198 and a processor 200 for computing a complex phasor $e^{-j \cdot theta}$. The NCO input values of $dtheta_{nDF}$ (in radians, initialized to zero) are accumulated to produce $theta_n$ on line 202. The FPLL output $sigdc_n$ is obtained after mixing the input signal to dc, then multiplying by a gain control value $sgain_n$ (computed later in the loop, initialized to zero), which attempts to maintain the main carrier at unity magnitude. The process can be summarized as:

"Compute first signal variables using input signal sig, and output samples sigdc"

theta(n)=theta(n−1)+dtheta(n−1); "dtheta, theta init to 0 for first iteration"

NCO(n)=exp{−j·theta(n)}; "compute conjugate phasor value"

mult(n)=sig(n)·NCO(n); "input signal shifted to dc"

sigdc(n)=mult(n)·sgain; "compute output samples with agc (carrier mag=1)".

The signal $mult_n$ is filtered and decimated by a factor of 9 (decimated sample rate approx 5168 Hz=44100*15/128) as shown in block 204, using the 45-tap FIR filter LPF1, producing filtered samples $multfilt_{nDF}$ on line 206. Filter LPF1 limits the bandwidth of $multfilt_{nDF}$ to approximately ±2 kHz. This reduces the effects of interference and permits some subsequent operations to operate at the decimated rate using decimated index nDF, instead of n. The signal multfilt is input to a frequency detector 208, a phase detector 210, and the gain control function 212 to compute $cmaghold_{nS}$ and $sgain_{nDF}$. The index nS implies samples at the symbol rate, which is decimated by a factor of 30 from the first Decimation Filter rate nDF. The decimation filter coefficients can be computed as follows:

"Compute and prestore coefficients of decimatioin filter LPF1"

$$LPF1x(k) = \begin{cases} 1; & \text{if } k = 22 \\ \frac{\sin\left[\frac{2 \cdot \pi}{23} \cdot (k-22)\right]}{\frac{2 \cdot \pi}{23} \cdot (k-22)} \cdot \sin\left[\frac{\pi}{50} \cdot (k+3)\right]^2; & k = 0 \ldots 44, k \neq 22 \end{cases}$$

$$LPF1(k) = \frac{LPF1x(k)}{\sum_{kk=0}^{44} LPF1x(kk)}; k = 0 \ldots 44 \text{ "normalize for unity dc gain"}$$

"Compute output of LPF1, decimate by 9"

$$multfilt(nDF) = \sum_{k=0}^{44} mult(9 \cdot nDF + k) \cdot LPF1(k);$$

"apply LPF1, decimate by 9".

The phase detector estimates the sample phase error in radians, while the frequency detector estimates the phase difference in radians between each pair of LPF1 decimated samples $multfilt_{nDF}$. The phase or frequency estimates on lines 214 and 216, of the complex samples rely on small angles being approximated by the imaginary component divided by its magnitude and passed to a loop filter 218. The value $cmaghold_{nS}$ is used instead of the instantaneous sample magnitude to allow the detectors to "flywheel" through signal fades where the magnitude is typically small with large phase noise. The phase and frequency detector estimates are computed at the decimated sample rate as follows:

$$phdet(nDF) = \min\left[1, \max\left[-1, \frac{\text{Im}\{multfilt(nDF)\}}{cmaghold(nDF)}\right]\right]$$

$$fdet(nDF) = \min\left[1, \max\left[-1, \frac{\text{Im}\{multfilt(nDF) \cdot multfilt^*(nDF-1)\}}{cmaghold(nDF)^2}\right]\right];$$

where * is the complex conjugate.

The gain control variables symbolmag, cmag, and cmaghold are updated at the symbol rate, and are derived from the decimated filter output groups of 30 samples. The variable $cmaghold_{nS}$ represents an average magnitude of a previous symbol and is used in the phase and frequency estimators. The variable $sgain_{nDF}$ is updated at the decimated rate (index nDF) and used to scale the level of the output signal. The automatic gain control (agc) action of $sgain_{nDF}$ is used to keep the main carrier at a magnitude of one. The gain control variables in this example are computed as:

$$symbolmag = \frac{1}{30} \cdot \sum_{nDF=0}^{29} |multfilt(nDF)|;$$

"updated at symbol rate"

$$cmag = \frac{3}{4} \cdot cmag + \frac{1}{4} \cdot symolmag;$$

"updated at symbol rate"

$$cmaghold = \max\left(cmaghold \cdot \frac{255}{256}, cmag, 10^{-6}\right);$$

"updated at symbol rate"

$$sgain(nDF) = \frac{255}{256} \cdot sgain(nDF) + \frac{1}{256 \cdot cmaghold};$$

"updated at decimated rate".

The carrier tracking of this invention uses an adaptive third order frequency/phase-locked loop (FPLL). The gain of the loop is adaptive in such a manner as to maintain a nearly constant damping factor over the entire range of operation from initial frequency acquisition through narrowband tracking. This feature ensures closed-loop stability while continuously maximizing tracking performance without excessive overshoot. The frequency detector is effective during acquisition to quickly bring the FPLL within phase acquisition range. Initial acquisition can acquire an initial frequency offset up to at least 2000 Hz.

Carrier tracking is implemented using an algorithm designed to operate independently of symbol synchronization, as the operations are performed on a sample-by-sample basis (270 samples/symbol) at a sample rate of approximately 46,512 Hz (44100*135/128). This obviates the need for external synchronization (e.g., symbol clock, or FFT lock conditions, etc.).

Figure 6:
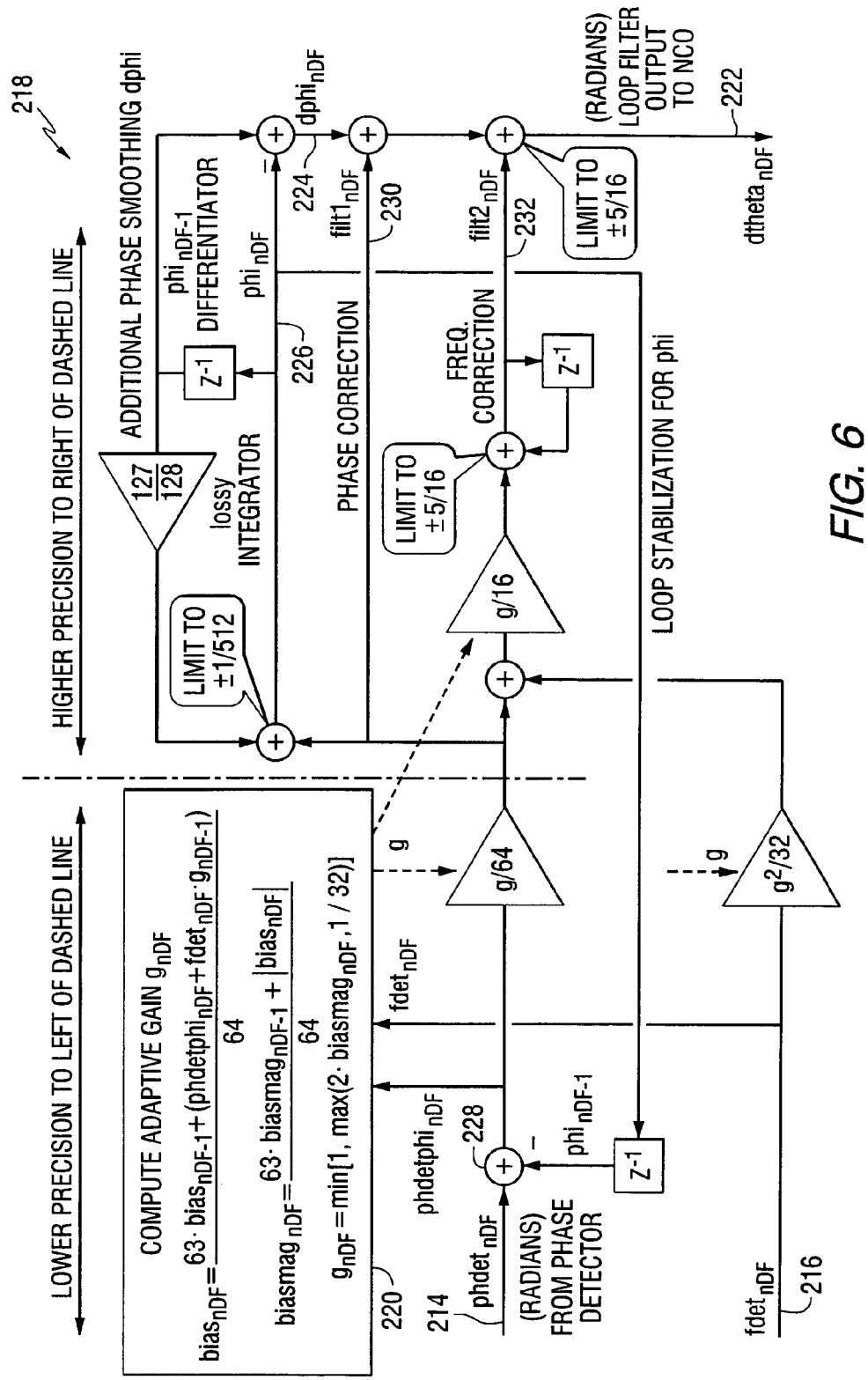
FIG. 6 is a functional block diagram of an adaptive loop filter.

Details of the loop filter 218 are shown in FIG. 6. The loop filter adaptively adjusts its gain in a manner that maintains a nearly constant damping factor around unity, as shown in block 220. This gain is a function of input phase bias or frequency error, and acts to facilitate fast acquisition and slow tracking when sufficiently phase-locked. The adaptive loop gain (g) is derived as a function of the internally estimated phase error bias magnitude (biasmag), which provides an appropriate metric for controlling the gain. Details and analyses of the loop filter parameters are discussed below. The inputs are the estimated frequency and phase detector values. The output on line 222 is the phase increment $dtheta_{nDF}$ for the NCO. All functions are performed at the decimated rate (index nDF). All variables are initialized to zero, except biasmag$_{nDF}$ is initialized to 1 after the first symbol output value of cmaghold$_{nDF}$ is computed.

FIG. 6 is a functional block diagram of the adaptive loop filter (using a floating point implementation). A novel phase smoothing feature produces a cancellation signal $dphi_{nDF}$ (on line 224) used to reduce the phase noise present in the output $dtheta_{nDF}$. This phase noise reduction technique also produces another variable $phi_{nDF}$ (on line 226) used to stabilize the loop. In effect, the loop stability operates as if the noise reduction filter were not present since the noise cancelled from the $dtheta_{nDF}$ output is reinserted into the loop at a point after it has no significant effect on $dtheta_{nDF}$. This additional stabilization (nearly) cancels the additional loop filtering effects resulting from $dphi_{nDF}$ cancellation.

The adaptive loop gain parameter g is computed as a function of the frequency and phase detector values. A phase error bias is first estimated to determine if the loop is in acquisition mode (large biasmag$_{nDF}$) or tracking (small biasmag$_{nDF}$). The computed value of the phase error phdet$_{nDF}$ is adjusted by phi$_{nDF}$ for stability compensation (as illustrated by summation point 228), and is used in the following algorithm to compute the adaptive value of g.

"Compute adaptive loop gain parameter $g$"

$phdetphi(nDF) = phdet(nDF) - phi(nDF - 1);$

"stability compensation for $dphi$"

$$bias = \frac{63 \cdot bias + fdet \cdot g + phdetphi}{64};$$

"phase bias estimate after filtering"

$$biasmag = \frac{63 \cdot biasmag + |bias|}{64};$$

"filter bias magnitude"

$$g = \min\left(1, \max\left(2 \cdot biasmag, \frac{1}{32}\right)\right);$$

"compute $1/32 <= g <= 1$".

The remaining loop filter parameters are computed next. The loop filter computes the first and second filter outputs filt1$_{nDF}$ and filt2$_{nDF}$, on lines 230 and 232. These signals are used to compute the next value of $dtheta_{nDF}$, which determines the phase increment for the NCO samples, using the following algorithm.

"Compute loop output $dtheta$, decimated sample rate $nDF$"

$$filt1 = \frac{g}{64} \cdot phdet;$$

"first-order loop parameter"

$phiprev = phi;$

"save $prev$ value for differential $dphi$"

$$phi = \max\left(\frac{-1}{512}, \min\left(\frac{1}{512}, filt1 + phi \cdot \frac{127}{128}\right)\right);$$

"stability compensation for small angles"

$dphi = phiprev - phi;$

"phase noise estimate (negative)"

$$filt2 = \max\left(\frac{-5}{16}, \min\left(\frac{5}{16}, \frac{g}{16} \cdot \left[\frac{g^2}{32} \cdot fdet + filt1\right] + filt2\right)\right);$$

"second-order loop filter"

"Compute $dtheta$ from loop filter,
with $+ -1531$ Hz limit,
& phase noise cancellation $dphi$"

$$dtheta = \max\left(\frac{-5}{16}, \min\left(\frac{5}{16}, filt1 + filt2 + dphi\right)\right)$$

"phase increment for $NCO$".

The derivation of the loop parameters is described next. The stability, damping factor and other performance parameters of the PLL are most conveniently analyzed in steady state operation using an ideal linear model approximation of the PLL. The linear model allows conventional servo control theory analysis techniques to determine appropriate design parameters, particularly for the loop filter, to control stability and performance in operation. This model, shown in FIG. 7, describes frequency in units of radians/sec, and signal values in volts.

Figure 7:
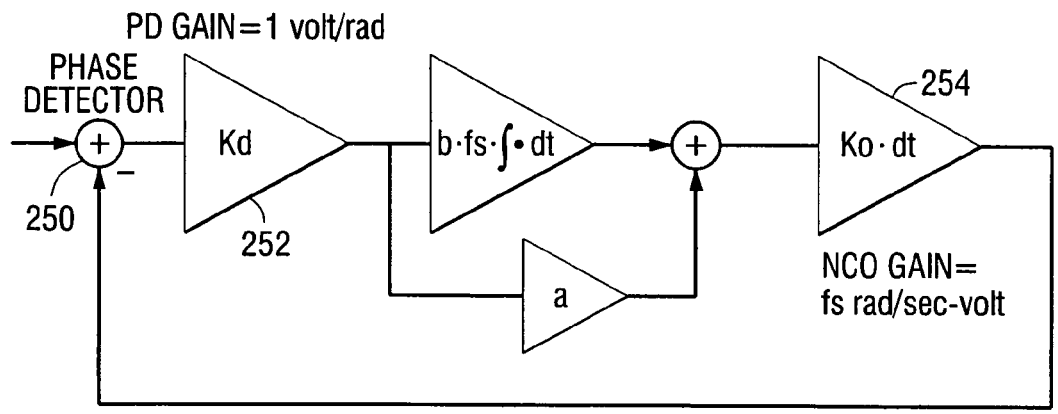
FIG. 7 is a linear model of a phase-locked loop, useful in determining gain values.

FIG. 7 is a simplified linear model of a PLL useful in determining gain values. A goal of the analysis is to determine the appropriate values for gain parameters a and b. For this analysis, however, we will start with derived values of a and b determined in a full analysis, and then characterize the resulting PLL performance with these assumed values. A brief summary of the PLL linear model analysis follows.

Referring to FIG. 7, the phase detector 250, including an amplifier 252 having a gain Kd, is designed with a gain of Kd=1 volt/rad. The NCO 254 is designed for a gain of Ko=fs rad/sec-volts. The two factors Kd and Ko can be conveniently expressed as one parameter K=fs.

The closed-loop transfer function H(s) of the linear model of the PLL can be used to assess the performance and stability. The transfer function is best described using Laplace Transform techniques. That is, $$H(s) = \frac{K \cdot F(s)}{s + K \cdot F(s)}$$

where F(s) is the embedded loop filter transfer function. An ideal second-order loop filter has a transfer function $$F(s) = -\left(\frac{1}{s \cdot C \cdot R1} + \frac{R2}{R1}\right).$$

Figure 8:
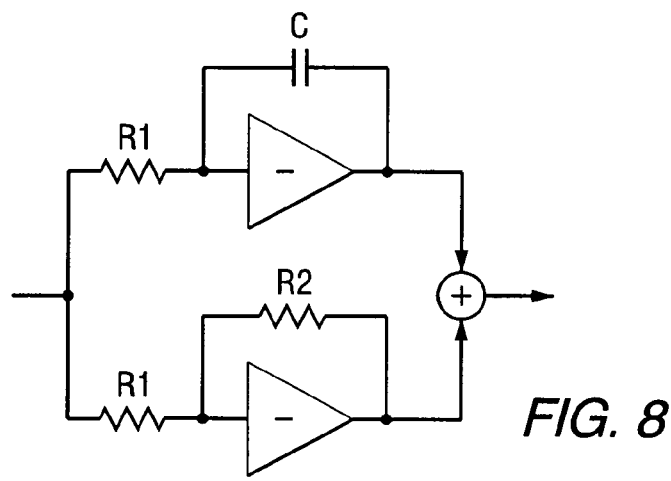
FIG. 8 is a schematic diagram that illustrates analog resistor-capacitor (RC) time constants.
Figure 9:
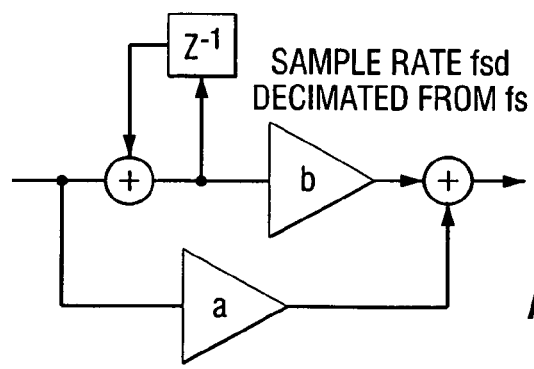
FIG. 9 is a schematic diagram that illustrates equivalent digital time constants.

Conventional analysis of the loop filter describes important characteristics of the PLL in terms of time constants τ1 and τ2. These time constants refer to properties of an integrator and gain components of a loop filter implemented with RC components used in an ideal second-order PLL. The relationships between these time constants and their digital equivalents are illustrated in FIGS. 8 and 9. It is assumed that the sample rate of the integrator in the loop filter is fsd, which is decimated by a factor of 9 relative to the FPLL signal input/output sample rate fs.

FIG. 8 is a schematic diagram that illustrates analog RC time constants. In FIG. 8, the time constants are:

τ1=R1·C, and τ2=R2·C.

FIG. 9 is a schematic diagram that illustrates equivalent digital time constants. In FIG. 9, the time constants are:

$$\tau 1 = \frac{1}{b \cdot fsd}, \text{ and } \tau 2 = \frac{a}{b \cdot fsd}.$$

The resulting transfer function for the PLL can now be rewritten as $$H(s) = \frac{K \cdot F(s)}{s + K \cdot F(s)} = \frac{K \cdot (s \cdot \tau 2 + 1)/\tau 1}{s^2 + s \cdot (K \cdot \tau 2/\tau 1) + K/\tau 1}.$$

Furthermore the transfer function can be described in servo terminology as $$H(s) = \frac{2 \cdot \zeta \cdot \omega_n \cdot s + \omega_n^2}{s^2 + 2 \cdot \zeta \cdot \omega_n \cdot s + \omega_n^2}$$

where $\omega_n$, is the natural frequency and $\zeta$ is the damping factor of the PLL, and $$\omega_n = \sqrt{\frac{K}{\tau 1}} = \sqrt{K \cdot b \cdot fsd} \text{ and } \zeta = \frac{\tau 2 \cdot \omega_n}{2} = \frac{a \cdot \omega_n}{2 \cdot b \cdot fsd}.$$

The analysis, design and simulation performance of the PLL suggests a desired value of a=g/64, and b=g²/1024. These values are chosen as a function of a controlled loop gain parameter g that allows the loop to acquire quickly, then track smoothly. The square of g is used in the second-order filter in order to maintain a constant damping factor as g varies. This relationship should become clear when we examine the expression for the damping factor. The PLL natural frequency can be computed as $$\omega_n = \sqrt{fs \cdot b \cdot fsd} = \frac{g \cdot fs}{32 \cdot 3} \cong 484 \cdot g \text{ rad/sec} \cong 77 \cdot g \text{ Hz}.$$

The resulting damping factor is then $$\zeta = \frac{a \cdot \omega_n}{2 \cdot b \cdot fsd} = \frac{3 \cdot a}{2 \cdot \sqrt{b}} = 0.75.$$

This damping factor is set slightly above critical damping (0.7071), which results in fast acquisition times with minimal overshoot. It is particularly important to notice that the damping factor is independent of the controlled loop gain value g. This is a result of using g as the multiplying factor for gain a, while g² is used as the multiplying factor for gain b. The square root in the denominator of the damping factor expression allows the variable g to cancel. This feature allows the PLL to operate consistently and converge quickly over a wide range of adaptive gain control. The addition of the frequency detection on the PLL is effective only during initial frequency acquisition.

Figure 10:
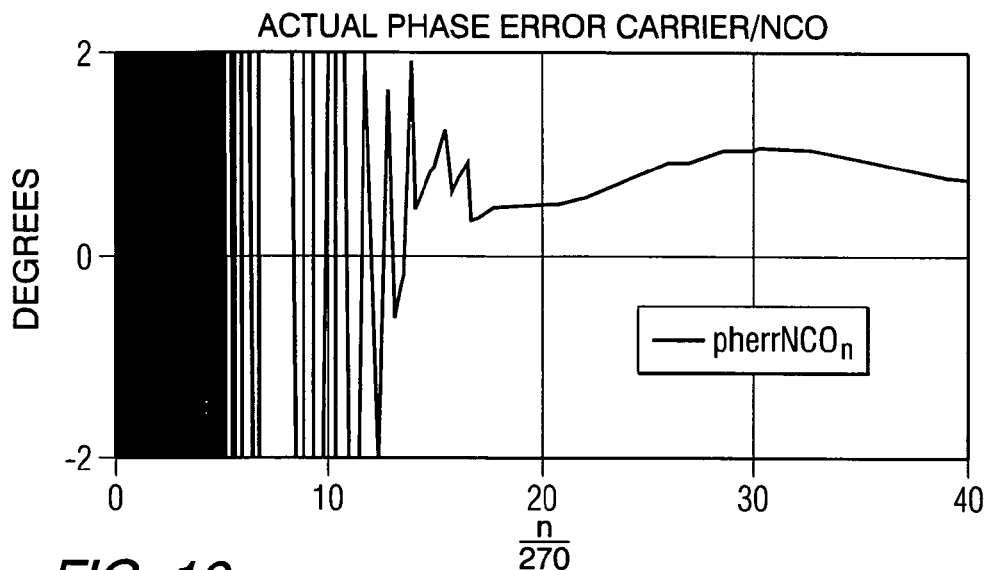
FIGS. 10-13 are graphs showing simulated performance of the invention.
Figure 11:
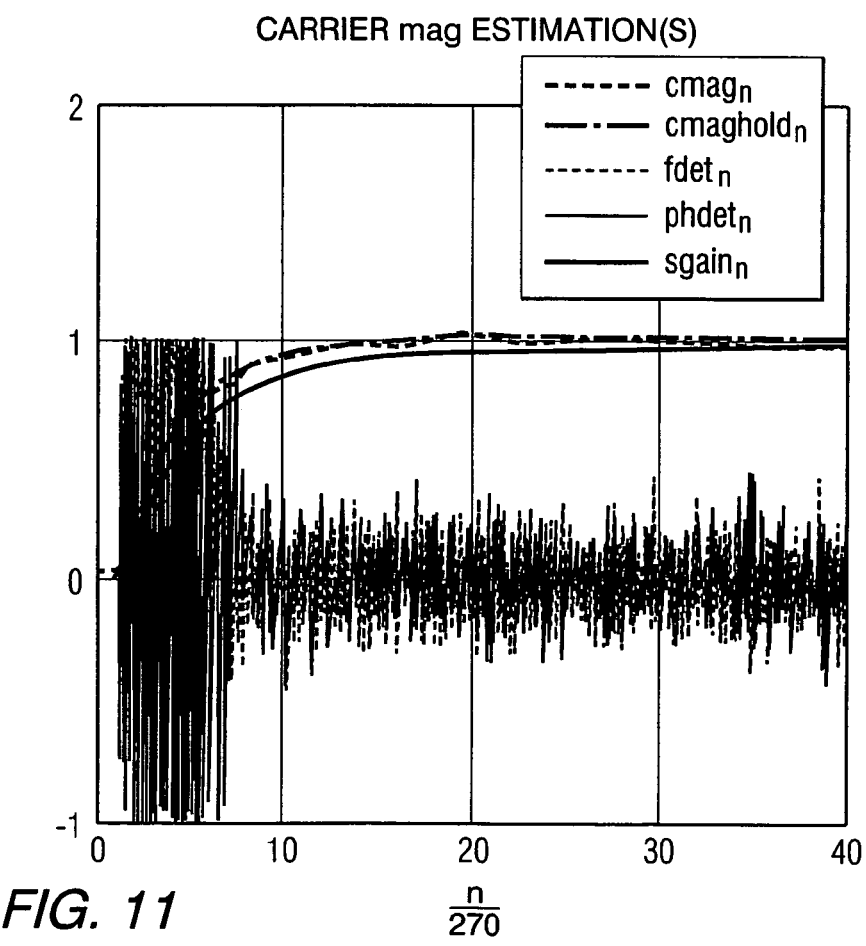
Figure 12:
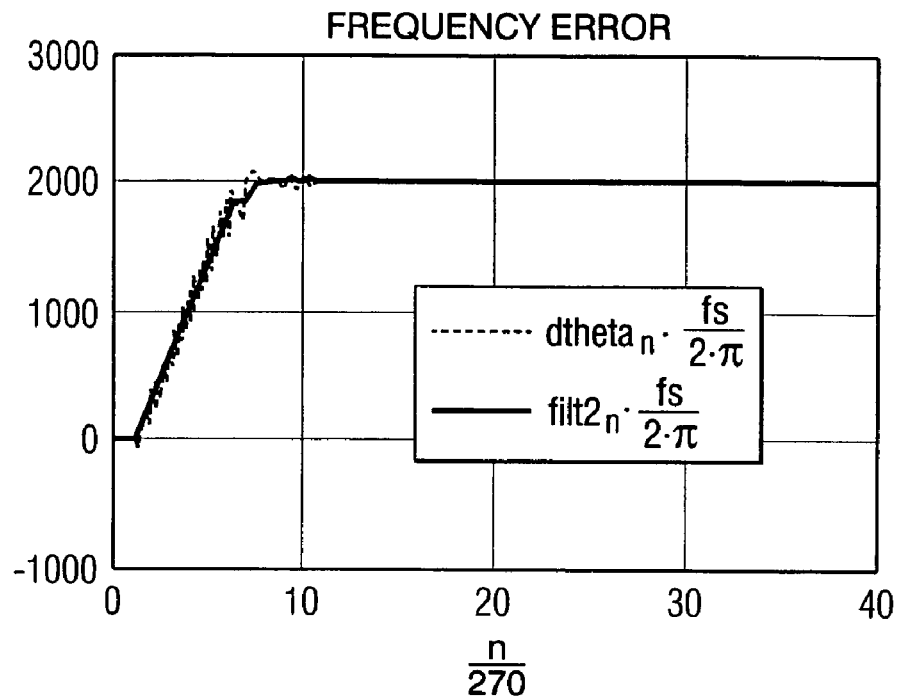
Figure 13:
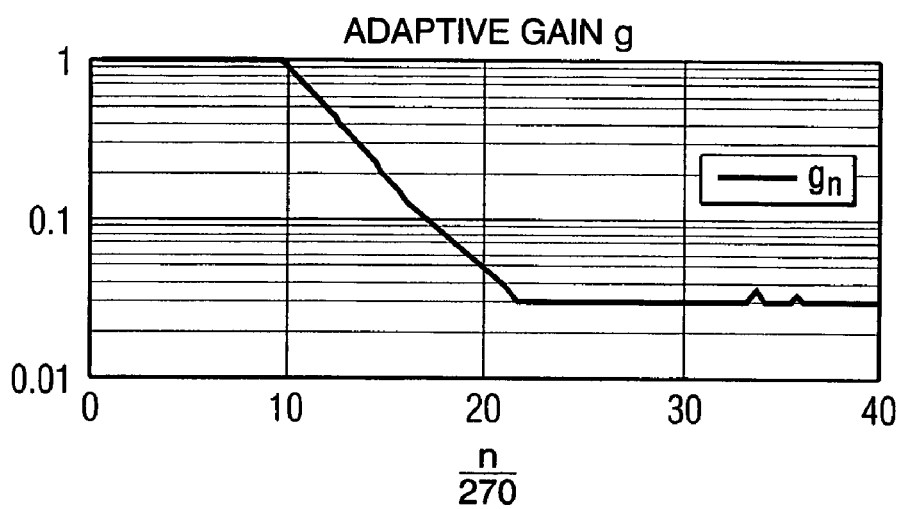

Performance results of a simulation of the invention are shown in FIGS. 10-13. FIG. 10 shows the calculated phase error. FIG. 11 shows the carrier magnitude estimate. FIG. 12 shows the frequency error. FIG. 13 shows the adaptive gain g.

Previously existing AM carrier tracking algorithms are complex and involve various modes of operation. Initial analyses, simulation performance, and field testing of the present invention indicate that the performance of this invention is as good or better with various channel impairments and outages. In addition, the final design can be adjusted by the parameter settings if needed.

The functions shown in the drawings can be implemented using known circuit components, including but not limited to, one or more processors or application specific integrated circuits.

While the invention has been described in terms of several examples, it will be apparent to those skilled in the art that various changes can be made to the described examples without departing from the scope of the invention as set forth in the following claims.

What is claimed is:

1. A method for carrier tracking in AM in-band on-channel radio receivers, the method comprising the steps of:
   receiving an input signal;
   generating a local oscillator signal in response to an oscillator control signal;
   mixing the input signal with a local oscillator signal to produce a first signal;
   filtering the first signal to produce a filtered first signal at a decimated sample rate;
   detecting the phase error and frequency error of the filtered first signal normalized to mitigate effects of signal fades;
   using an adaptive loop filter to produce the oscillator control signal in response to the phase error and frequency error of the filtered first signal;
   computing a gain control signal in response to the filtered first signal; and
   multiplying the first signal by the gain control signal to produce an output signal, wherein the square of the gain control signal is used to maintain a nearly constant damping factor.

2. The method of claim 1, wherein the adaptive loop filter is an adaptive third order frequency/phase-locked loop.

3. The method of claim 1, wherein the adaptive loop filter maintains a nearly constant damping factor over a range of operation from initial frequency acquisition through narrowband tracking.

4. The method of claim 1, wherein the input signal comprises a plurality of samples, and the steps of claim 1 are performed on a sample-by-sample basis.

5. The method of claim 1, wherein the first filtered signal has a bandwidth limited to approximately ±2 kHz.

6. The method of claim 1, wherein an adaptive loop gain parameter is computed as a function of the detected phase error and frequency error.

7. The method of claim 1, wherein the loop filter produces a cancellation signal to reduce phase noise in the local oscillator signal due to a proportional component of a proportional plus integral output of the loop filter.

8. A method for carrier tracking in AM in-band on-channel radio receivers, the method comprising the steps of:
   receiving an input signal;
   generating a local oscillator signal in response to an oscillator control signal;
   mixing the input signal with a local oscillator signal to produce a first signal;
   filtering the first signal to produce a filtered first signal at a decimated sample rate;
   detecting the phase error and frequency error of the filtered first signal normalized to mitigate effects of signal fades;
   using an adaptive loop filter to produce the oscillator control signal in response to the phase error and frequency error of the filtered first signal;
   computing a gain control signal in response to the filtered first signal; and
   multiplying the first signal by the gain control signal to produce an output signal, wherein the gain control signal is derived as a function of an estimated phase error bias magnitude.

9. A method for carrier tracking in AM in-band on-channel radio receivers, the method comprising the steps of:
   receiving an input signal;
   generating a local oscillator signal in response to an oscillator control signal;
   mixing the input signal with a local oscillator signal to produce a first signal;
   filtering the first signal to produce a filtered first signal at a decimated sample rate;
   detecting the phase error and frequency error of the filtered first signal normalized to mitigate effects of signal fades;
   using an adaptive loop filter to produce the oscillator control signal in response to the phase error and frequency error of the filtered first signal;
   wherein the input signal comprises a plurality of samples; and
   wherein the step of detecting the phase error and frequency error of the filtered first signal estimates a sample phase error, and estimates a phase difference angle between each pair of the filtered samples for the frequency error.

10. The method of claim 9, wherein small angles are approximated by the imaginary component divided by a magnitude value.

11. The method of claim 9, wherein a computed value of phase error is adjusted for stability compensation.

12. A method for carrier tracking in AM in-band on-channel radio receivers, the method comprising the steps of:
   receiving an input signal;
   generating a local oscillator signal in response to an oscillator control signal;
   mixing the input signal with a local oscillator signal to produce a first signal;
   filtering the first signal to produce a filtered first signal at a decimated sample rate;
   detecting the phase error and frequency error of the filtered first signal normalized to mitigate effects of signal fades;
   using an adaptive loop filter to produce the oscillator control signal in response to the phase error and frequency error of the filtered first signal, wherein the loop filter produces a cancellation signal to reduce phase noise in the local oscillator signal due to a proportional component of a proportional plus integral output of the loop filter; and
   generating a loop stabilization signal to compensate for a reduction in loop stability due to the cancellation signal.

13. An apparatus for carrier tracking in AM in-band on-channel radio receivers, the apparatus comprising:
   an input for receiving an input signal;
   a local oscillator for generating a local oscillator signal in response to an oscillator control signal;
   a mixer for mixing the input signal with a local oscillator signal to produce a first signal;
   a filter for filtering the first signal to produce a filtered first signal at a decimated sample rate;
   a detector for detecting the phase error and frequency error of the filtered first signal, wherein the filtered first signal is normalized to mitigate effects of signal fades;
   an adaptive loop filter for producing the oscillator control signal in response to the phase error and frequency error of the filtered first signal;
   a processor for computing a gain control signal in response to the filtered first signal; and
   a second mixer for multiplying the first signal by the gain control signal to produce an output signal, wherein the square of the gain control signal is used to maintain the nearly constant damping factor.

14. The apparatus of claim 13, wherein the adaptive loop filter is an adaptive third order frequency/phase-locked loop.

15. The apparatus of claim 13, wherein the adaptive loop filter maintains a nearly constant damping factor over the entire range of operation from initial frequency acquisition through narrowband tracking.

16. The apparatus of claim 13, wherein the input signal comprises a plurality of samples.

17. The apparatus of claim 13, wherein the first signal has a bandwidth limited to approximately ±2 kHz.

18. The apparatus of claim 13, wherein the oscillator control signal reduces phase noise in the local oscillator signal due to a proportional component of a proportional plus integral output of the loop filter.

19. The apparatus of claim 13, wherein the loop filter generates a loop stabilization signal to compensate for filtering effects of the loop filter on loop stability and to reduce additional loop filtering effects resulting from the phase noise.

20. An apparatus for carrier tracking in AM in-band on-channel radio receivers, the apparatus comprising:
   an input for receiving an input signal;
   a local oscillator for generating a local oscillator signal in response to an oscillator control signal;
   a mixer for mixing the input signal with a local oscillator signal to produce a first signal;
   a filter for filtering the first signal to produce a filtered first signal at a decimated sample rate;
   a detector for detecting the phase error and frequency error of the filtered first signal, wherein the filtered first signal is normalized to mitigate effects of signal fades;
   an adaptive loop filter for producing the oscillator control signal in response to the phase error and frequency error of the filtered first signal;

a processor for computing a gain control signal in response to the filtered first signal; and a second mixer for multiplying the first signal by the gain control signal to produce an output signal, wherein the gain control signal is derived as a function of an estimated phase error bias magnitude.

21. An apparatus for carrier tracking in AM in-band on-channel radio receivers, the apparatus comprising:

an input for receiving an input signal;

a local oscillator for generating a local oscillator signal in response to an oscillator control signal;

a mixer for mixing the input signal with a local oscillator signal to produce a first signal;

a filter for filtering the first signal to produce a filtered first signal at a decimated sample rate;

a detector for detecting the phase error and frequency error of the filtered first signal, wherein the filtered first signal is normalized to mitigate effects of signal fades;

an adaptive loop filter for producing the oscillator control signal in response to the phase error and frequency error of the filtered first signal, wherein the input signal comprises a plurality of samples; and wherein the phase error estimates a sample phase error and the frequency error estimates a phase difference angle between each pair of the filtered samples.

* * * * *